(12) United States Patent
Hempelmann et al.

(10) Patent No.: US 7,890,456 B2
(45) Date of Patent: *Feb. 15, 2011

(54) SHARING OF DATABASE OBJECTS

(75) Inventors: Henrik Hempelmann, Havelberg (DE); Martin Kittel, Berlin (DE); Torsten Strahl, Kleinmachnow (DE); Uwe H. O. Hahn, Berlin (DE)

(73) Assignee: SAP AG, Walldorf (DE)

( * ) Notice: Subject to any disclaimer, the term of this patent is extended or adjusted under 35 U.S.C. 154(b) by 323 days.

This patent is subject to a terminal disclaimer.

(21) Appl. No.: 11/715,777

(22) Filed: Mar. 8, 2007

(65) Prior Publication Data

US 2008/0217393 A1  Sep. 11, 2008

(51) Int. Cl.
G06F 7/00 (2006.01)

(52) U.S. Cl. .................. 707/610; 707/637; 707/740; 707/802; 707/966

(58) Field of Classification Search ............ None
See application file for complete search history.

(56) References Cited

U.S. PATENT DOCUMENTS

| | | | | |
|---|---|---|---|---|
| 5,918,229 | A * | 6/1999 | Davis et al. | 707/10 |
| 6,353,837 | B1 * | 3/2002 | Blumenau | 707/205 |
| 6,658,417 | B1 * | 12/2003 | Stakutis et al. | 707/10 |
| 6,742,028 | B1 * | 5/2004 | Wang et al. | 709/223 |
| 6,763,423 | B2 * | 7/2004 | Stakutis et al. | 711/5 |
| 2005/0262103 | A1 * | 11/2005 | Stakutis et al. | 707/10 |
| 2007/0050381 | A1 * | 3/2007 | Hu et al. | 707/100 |
| 2007/0226270 | A1 * | 9/2007 | Sarma et al. | 707/201 |

* cited by examiner

*Primary Examiner*—Tim T. Vo
*Assistant Examiner*—Anh Tai V Tran
(74) *Attorney, Agent, or Firm*—Buckley, Maschoff & Talwalkar LLC

(57) ABSTRACT

A system may include reading a provider database mapping of file identifiers to page numbers of the provider database, determining one or more shared database objects of the provider database based on the provider database mapping, and registering the one or more shared database objects in a local namespace of a reader database.

15 Claims, 7 Drawing Sheets

| File ID | Page No. |
|---|---|
| asd34511 | 2309 |
| 9rjf8fjf8 | 180 |
| redi0003 | 10897 |
| 3edm89uh | 567 |

1028

| File ID | Page No. |
|---|---|
| dj89wejh | 43 |
| 90utjf24 | 567 |
| asd34511 | 15667 |
| e12308uf | 4321 |

| File ID | Page No. |
|---|---|
| 0:dj89wejh | 0:43 |
| 0:90utjf24 | 0:567 |
| 0:asd34511 | 0:15667 |
| 0:e12308uf | 0:4321 |
| 1:asd34511 | 1:2309 |
| 1:9rjf8fjf8 | 1:180 |
| 1:redi0003 | 1:10897 |
| 1:3edm89uh | 1:567 |

| File ID | Object Name | Columns | Data Types | Permissions | Indices | Shared |
|---|---|---|---|---|---|---|
| asd34511 | ~~~~~ | ~~~~~ | ~~~~~ | ~~~~~ | ~~~~~ | no |
| 9rjf8fj8 | ~~~~~ | ~~~~~ | ~~~~~ | ~~~~~ | ~~~~~ | yes |
| redi0003 | ~~~~~ | ~~~~~ | ~~~~~ | ~~~~~ | ~~~~~ | no |
| 3edm89uh | ~~~~~ | ~~~~~ | ~~~~~ | ~~~~~ | ~~~~~ | yes |

FIG. 8 — 1131

| File ID | Object Name | Columns | Data Types | Permissions | Indices |
|---|---|---|---|---|---|
| 0:asd34511 | ~~~~~ | ~~~~~ | ~~~~~ | ~~~~~ | ~~~~~ |
| 0:dj89wejh | ~~~~~ | ~~~~~ | ~~~~~ | ~~~~~ | ~~~~~ |
| 0:90utjf24 | ~~~~~ | ~~~~~ | ~~~~~ | ~~~~~ | ~~~~~ |
| 0:e12308uf | ~~~~~ | ~~~~~ | ~~~~~ | ~~~~~ | none |
| 1:9rjf8fj8 | ~~~~~ | ~~~~~ | ~~~~~ | ~~~~~ | none |
| 1:3edm89uh | ~~~~~ | ~~~~~ | ~~~~~ | ~~~~~ | ~~~~~ |

SHARING OF DATABASE OBJECTS

FIELD

Some embodiments relate to accessing data objects stored within a database system. In particular, some embodiments concern sharing database objects of a provider database among one or more reader databases.

BACKGROUND

A conventional database-driven system may include several computing environments, each consisting of one or more applications and a database instance storing data associated with the one or more applications. Such a system may provide online transaction processing for several different vendors. For example, each computing environment may store data specific to a particular vendor and may be responsible for processing online transactions on behalf of the vendor.

A system as described above typically stores a significant amount of identical data across each database instance. This data may comprise static data unrelated to any specific vendor, such as payment processing data, shipping data, etc. Duplicative storage of this data is inefficient, particularly if this duplication is not intended for backup or redundancy. Moreover, the entire portion of static data must be recreated each time an additional environment is required (e.g., to support an additional vendor).

Systems are therefore desired to provide one or more database instances with efficient access to a common set of data objects.

BRIEF DESCRIPTION OF THE DRAWINGS

FIG. 6A illustrates a portion of a provider database file directory and a portion of a reader database file directory.

FIG. 6B illustrates a portion of a reader database file directory including reader-specific and provider-specific file identifiers and page numbers.

FIG. 7 illustrates a provider database catalog associating file identifiers with metadata indicating whether associated database objects are shared.

FIG. 8 illustrates a reader database catalog associating provider-specific file identifiers with metadata of shared database objects and associating reader-specific file identifiers with metadata of local database objects.

DETAILED DESCRIPTION

Figure 1:
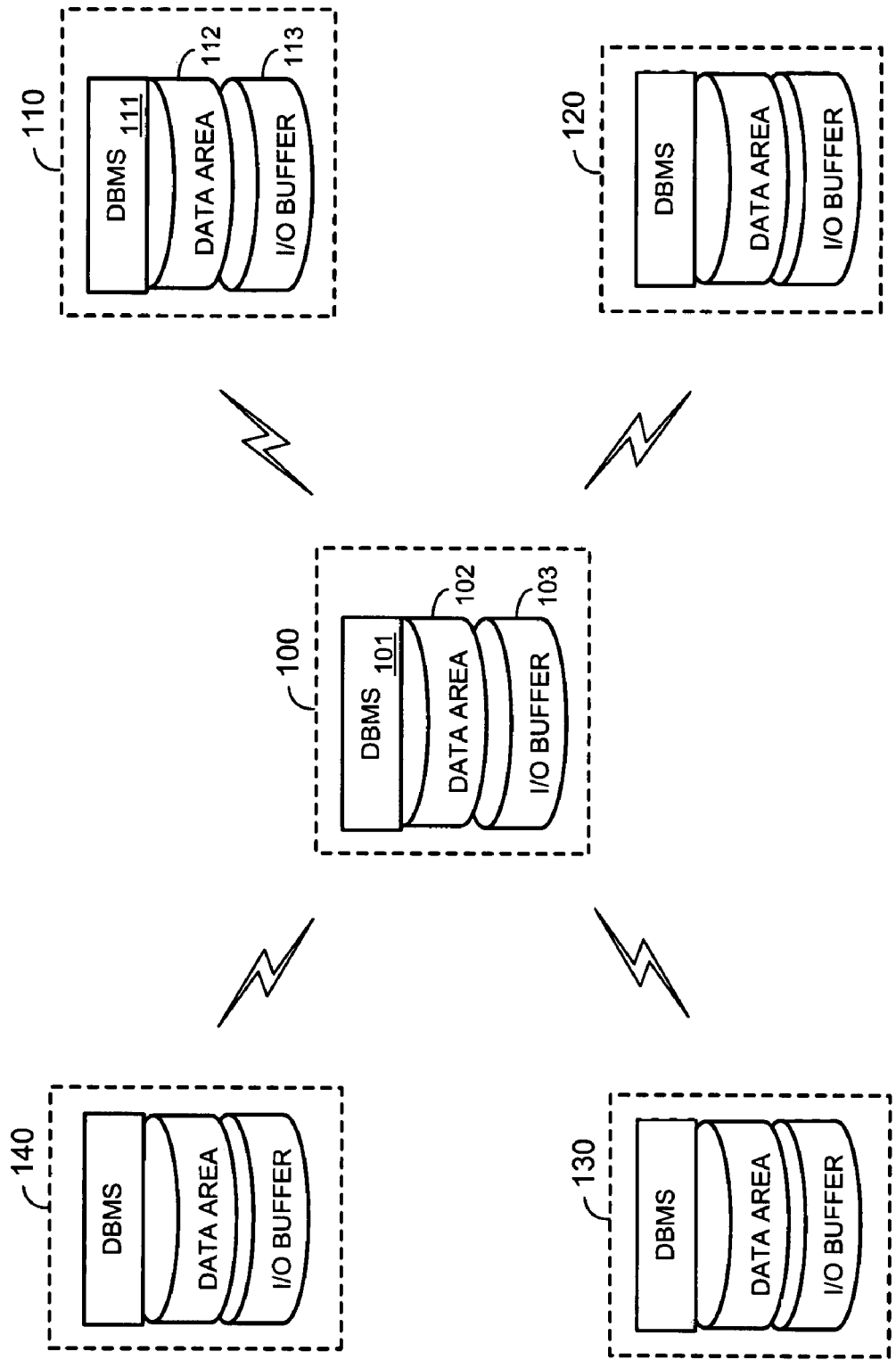
FIG. 1 is a block diagram of a general software architecture according to some embodiments.

FIG. 1 is a block diagram of a software architecture according to some embodiments. The architecture includes provider database instance 100 and reader database instances 110, 120, 130 and 140. In some embodiments, reader database instances 110, 120, 130 and 140 are capable of accessing data of provider database instance 100 directly. The data may, according to some embodiments, be accessed while database management system 101 of provider database instance 100 is not executing.

A database instance, generally, includes at least one operating system process, a physical data storage unit and a block of main memory (e.g., Random Access Memory). These components are represented in the database instances of FIG. 1 by a database management system (DBMS), a data area and an I/O buffer, respectively. The present description will use the terms "database" and "database instance" interchangeably.

Each illustrated DBMS may comprise any system for managing a database instance that is or becomes known. Generally, a DBMS may receive requests for data (e.g., Structured Query Language (SQL) requests from a database application), may retrieve requested data from its local data area, and may return the requested data to the requestor. A DBMS may also perform start-up, logging, recovery, management, optimization, monitoring and other database-related tasks.

A data area may comprise one or more disparate physical systems for storing data. The data of a data area may include data records and associated index entries (i.e. application data), as well as configuration files, system files, converter pages, database parameters, paths, user information and any other suitable information. A data area may also store a database catalog including metadata associated with database objects that are stored within the data area. These database objects may include tables, indexes, views, users and user groups.

According to some embodiments, at least one of reader database instances 110, 120, 130 and 140 has access to data area 102 of provider database instance 100. This access allows the at least one reader database instance to read the configuration files, file directory, converter pages and other elements of provider database instance 100 that may be required to directly access the database objects of provider database instance 100. Some embodiments providing such direct access will be described in detail below.

During execution of a database instance, the I/O buffer cache stores various elements of the data area. These elements may include recently-accessed pages of application data, current converter pages, database catalog objects and/or a log queue.

Some embodiments may include more or fewer than the four pictured reader database instances. In some embodiments, a single reader database instance may be capable of accessing data of two or more provider database instances.

Any of the FIG. 1 database instances may communicate with one or more database applications (not shown) over one or more interfaces provided by its DBMS. The applications may provide business monitoring, inventory control, online shopping, and/or any other suitable functions. The applications may, in turn, support client applications that may be executed by client devices. Such a client application may simply comprise a Web browser to access and display reports generated by a database application.

Database instances 100, 110, 120, 130 and 140 may receive data from disparate hardware and software systems, some of which are not interoperational with one another. The systems may comprise a back-end data environment employed in a business or industrial context. The data may be pushed to the database instances and/or provided in response to queries received therefrom.

The FIG. 1 database instances may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Two or more of the database instances of FIG. 1 may be located remote from one another and may communicate with one another via a computer network and/or a dedicated connection. Moreover, each displayed element of FIG. 1 may comprise any number of hardware and/or software elements, some of which are located remote from each other.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
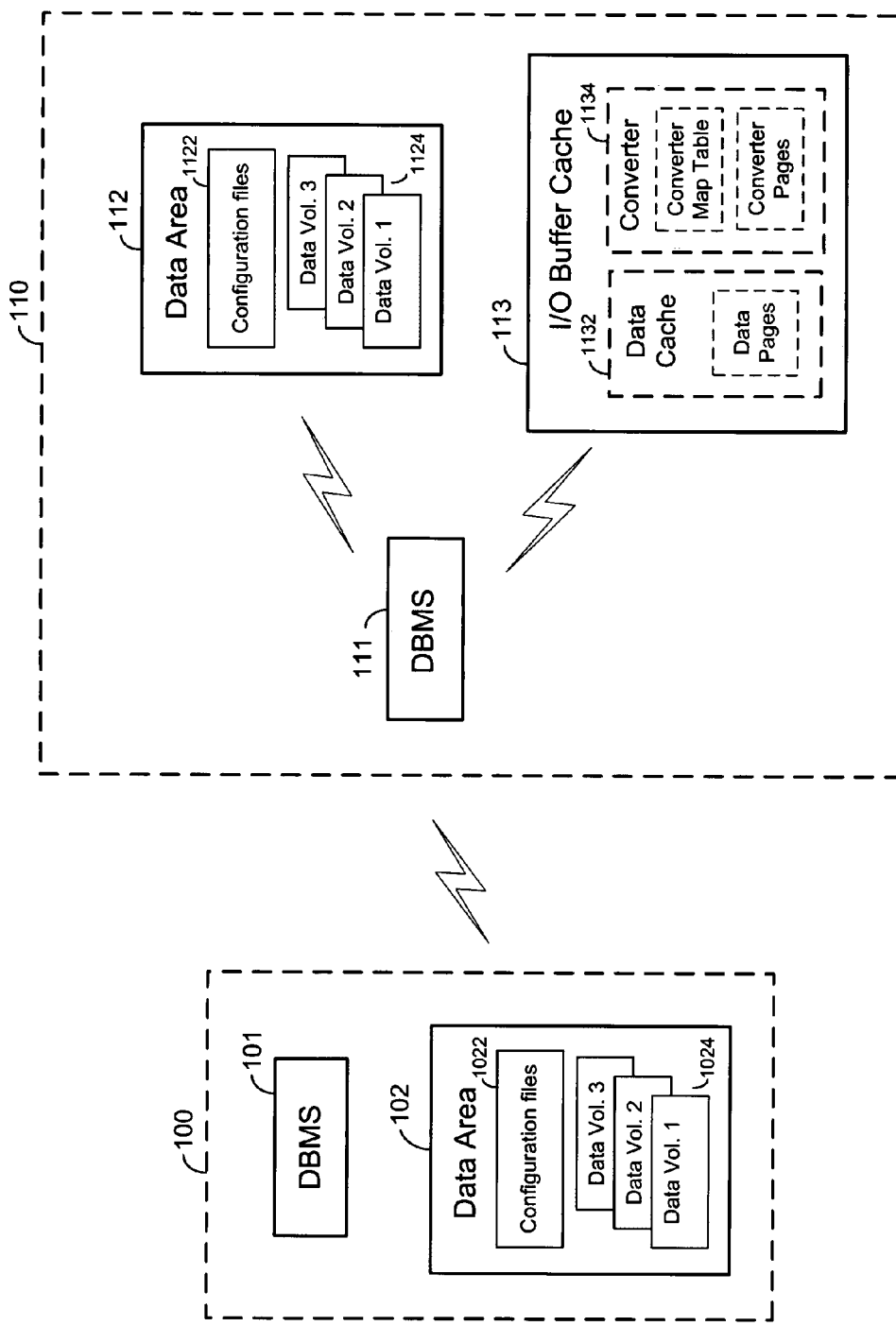
FIG. 2 is a detailed block diagram of a provider database instance and a reader database instance according to some embodiments.

FIG. 2 is a detailed block diagram of provider database instance 100 and reader database instance 110 according to some embodiments. I/O buffer cache 103 is omitted from FIG. 2 because the foregoing explanation presumes that DBMS 101 of provider database instance 100 is not executing.

Data area 102 includes configuration files 1022 and data volumes 1024. Configuration files 1022 store parameters for defining properties of database instance 100. These parameters may specify a size and physical location (i.e. path) of each data volume, and a maximum number of data volumes in data area 102.

As described above, data volumes 1024 may comprise not only application data but also system tables, converter pages and a database catalog including metadata associated with tables, indexes, views, users and user groups that are stored within the data area. A data volume may comprise a portion of a physical hard disk, an entire physical hard disk, or a storage system composed of several physical hard disks.

Data volumes 1024 are subdivided into storage areas known as blocks. Also, the data stored in data volumes 1024 is formatted into basic units (i.e. logical pages) having the same size as a physical block. Accordingly, a page of data volumes 1024 may be accessed by referencing a volume and a block address in which the page is stored.

Data area 102 may include more or fewer data volumes than illustrated in FIG. 2. Database instance 100 may also store log volumes in a log area (not shown). Such log volumes store information indicating changes made to stored data. The information may be used for returning database instance 100 to a consistent state after a system crash.

DBMS 111 and data area 112 of reader database instance 110 may be configured similarly to DBMS 101 and data area 102 of provider database instance 100. In some embodiments, DBMS 111 includes an SQL manager to process received SQL statements and a data access manager to manage access to stored data. Since reader database instance 110 will be executing in the forthcoming operational example, FIG. 2 also includes I/O buffer cache 113 of database instance 110.

I/O buffer cache 113 is used to manage memory that is available for I/O operations. I/O buffer cache 113 includes data cache 1132 and converter 1134. Generally, data cache 1132 stores pages from data area 112 that have been recently read or write-accessed. If a transaction changes a page, the changed page is initially saved in data cache 1132 while the previous version of the page remains in data area 112. At various intervals (e.g., if data cache 1132 reaches a threshold fullness or if a savepoint is scheduled), the changed data page is written to a location of one of data volumes 1124.

Converter 1134 associates logical page numbers of data area 112 with physical block addresses of data volumes 1124. For a given page number, converter 1134 indicates a block address (e.g., a data volume number and an offset) at which an associated page is stored in data volumes 1124. In a case that DBMS 111 cannot find a page in data cache 1132, converter 1134 is accessed to determine a location of the page in data volumes 1124 based on the page's number.

Converter 1134 includes a converter map table and converter pages according to some embodiments. For each logical page number, the converter map table specifies a memory address of I/O buffer cache 113 at which a converter page associated with the page number is located. The associated converter page, in turn, indicates a data volume and a block address for each of several logical page numbers. Each converter page also indicates a data volume and a block address at which the converter page is stored in data volumes 1124.

Data cache 1132 and converter 1134 are illustrated separately in FIG. 2 for the sake of clarity. According to some embodiments, data cache 1132 and converter 1134 might not comprise separate, contiguous memory addresses of I/O buffer cache 113. For example, the converter pages may be interspersed among the data pages throughout I/O buffer cache 113.

Figure 3:
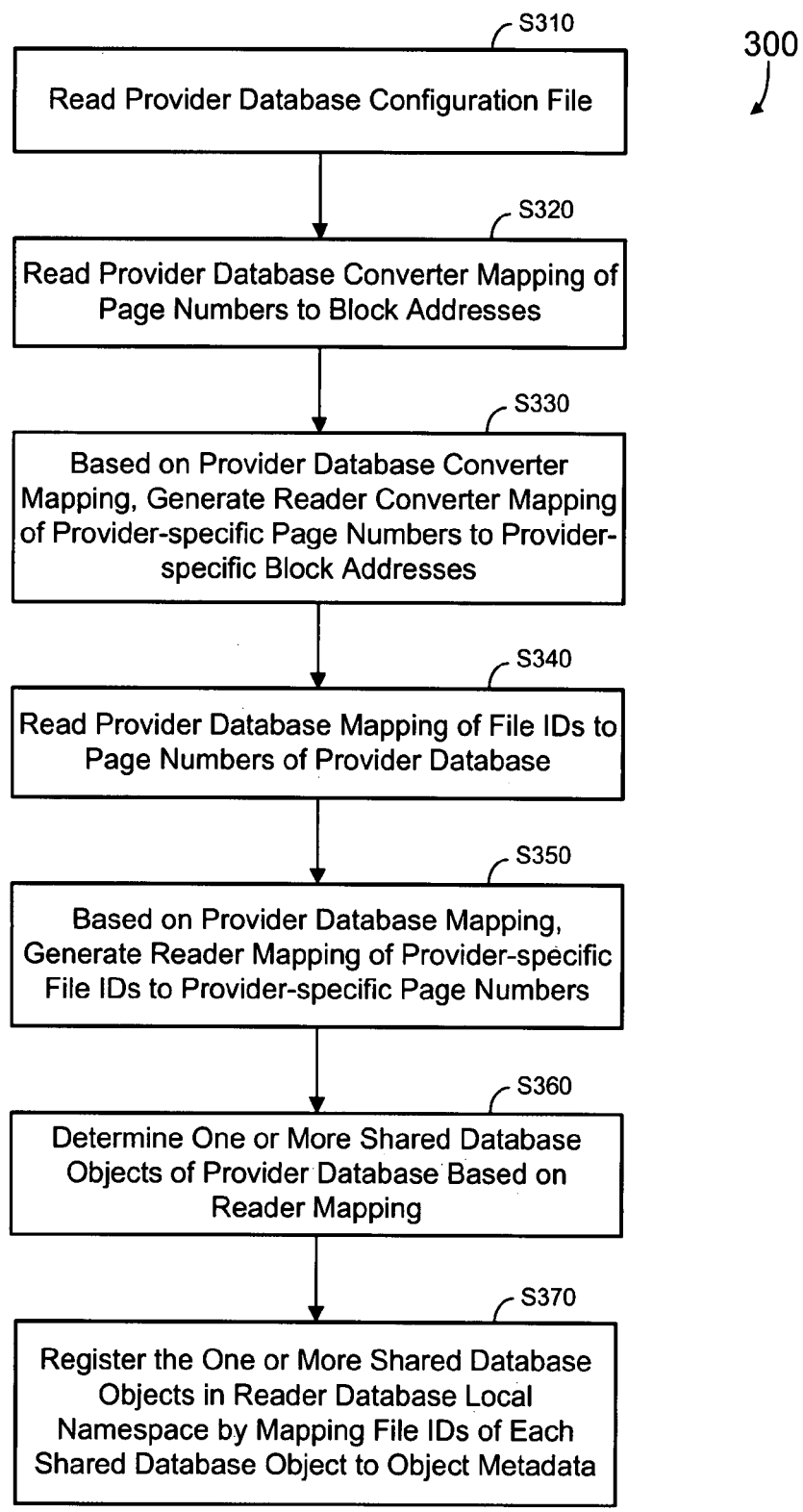
FIG. 3 comprises a flow diagram of a process according to some embodiments.

FIG. 3 is a flow diagram of process 300 according to some embodiments. Some embodiments of process 300 may provide a reader database instance with access to data objects of a provider database instance. In some embodiments, a hardware environment of database instance 110 executes program code of DBMS 111 to perform process 300.

Process 300 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, a provider database configuration file is read. According to the present example, DBMS 111 may read configuration files 1022 of data area 102 at S310. In order to facilitate reading of configuration files 1022, DBMS 111 is provided with a path to configuration files 1022 and a physical storage unit storing configuration files 1022 must be accessible to DBMS 111. In some embodiments, configuration files 1022 are stored in an <independent_data_path>/config directory of the physical storage unit.

The provider database configuration file includes the names of each of data volumes 1024 as well as their respective data paths. This information is used at S320 to read the provider database converter pages stored in data volumes 1024. The converter pages provide a mapping of logical page numbers to block addresses within data volumes 1024.

Figure 4A:
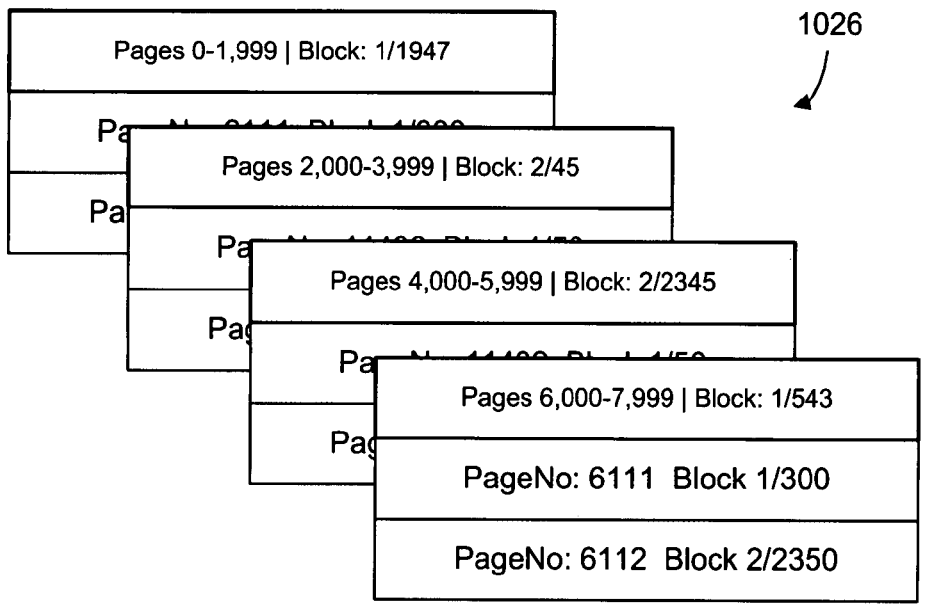
FIG. 4A illustrates portions of provider database instance converter pages according to some embodiments.

FIG. 4A includes portions of provider database converter pages 1026 that are read at S320 according to some embodiments. Converter pages 1026 are for illustrative purposes—many more converter pages than shown may be read at S320. Each of pages 1026 provides a mapping of logical page numbers to respective block addresses of data area 102. The block addresses are represented as a volume number/offset, and the volume number refers to one of volumes 1024 of data area 102. Each converter page also specifies its own storage location within data volumes 1024.

Figure 4B:
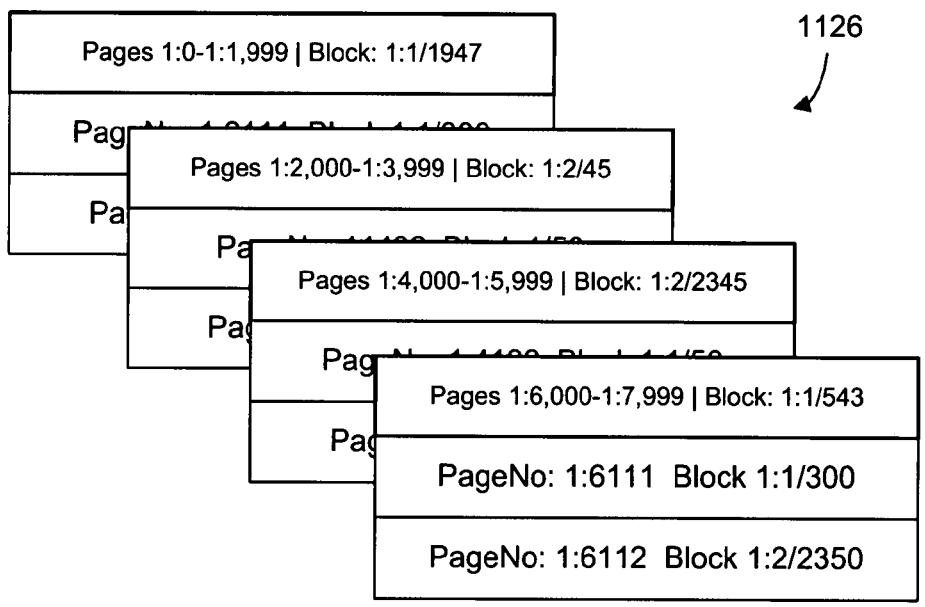
FIG. 4B illustrates portions of reader database instance converter pages including provider-specific page numbers and block addresses.

A reader converter mapping is generated based on the read provider database converter mapping at S330. The reader converter mapping maps provider-specific logical page numbers to provider-specific block addresses. FIG. 4B illustrates such a mapping according to some embodiments.

Converter pages 1126 of FIG. 4B have been generated to indicate provider-specific page numbers and block addresses. As shown, each logical page number and each block address has been prefaced by a "1:" to indicate that the page numbers and block addresses are specific to provider database instance 100. The provider-specific prefix may be necessary to avoid confusion with identically-numbered logical pages or data volumes of reader database instance 110.

Converter pages 1126 might not be stored persistently in data volumes 1124 of reader database instance 110 to reduce persistent memory consumption. In some embodiments, converter pages 1126 are stored in data volumes 1124 and a second converter is created in I/O buffer cache 113 to reflect converter pages 1126.

Figure 5A:
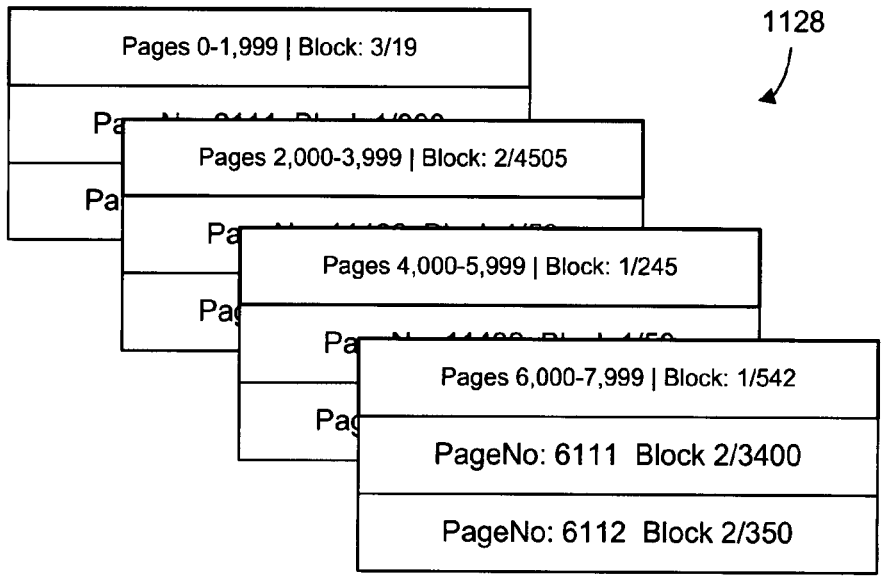
FIG. 5A illustrates portions of reader database instance converter pages according to some embodiments.
Figure 5B:
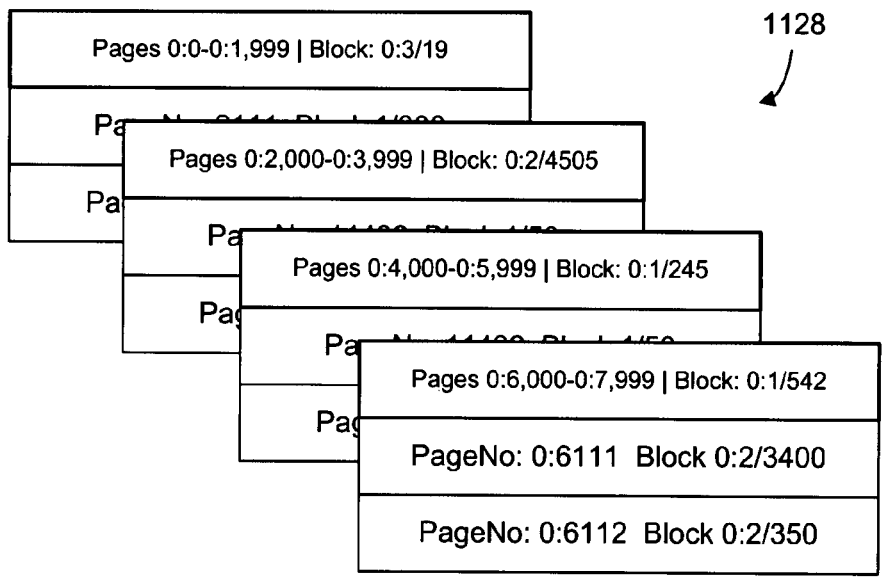
FIG. 5B illustrates portions of reader database instance converter pages including reader-specific page numbers and block addresses.

The existing converter pages and converter 1134 of reader database instance 110 may be updated at S330 as well. FIG. 5A illustrates converter pages 1128 of reader database instance 110 prior to S330. Converter pages 1128 may be stored in data area 112 and represented in converter 1134. FIG. 5B shows converter pages 1128 after being updated to include reader database-specific page numbers and block addresses. In the illustrated example, the prefix "0:" indicates a page number or data volume of reader database instance 110.

Returning to process 300, a mapping of file identifiers to page numbers is read at S340. The mapping associates file identifiers of the provider database instance with logical page numbers of the provider database. Such a mapping is used by the provider database instance to locate stored data based on a file identifier. The mapping may comprise a file directory of database instance 100. Data volumes 1024 of provider database instance 100 may include a system table FILES which provides, for each internal database file, a file identifier and a logical page number of the file root. The mapping may be read from this system table in some embodiments of S340.

FIG. 6A illustrates portion 1028 of a mapping of file identifiers to logical page numbers of provider database instance 100. FIG. 6A also illustrates portion 1129 of a mapping of file identifiers to logical page numbers of reader database instance 110. As shown, provider database instance 100 and reader database instance 110 may use one or more identical file identifiers and page numbers.

A reader mapping of provider-specific file identifiers to provider-specific page numbers is generated at S350. Mapping 1130 of FIG. 6B illustrates such a mapping generated based on mappings 1028 and 1129 of FIG. 6A. The file identifiers and page numbers associated with provider database instance 100 are prefaced with "1:" and those associated with database instance 110 are prefaced with "0:". Mapping 1130 may comprise a file directory of reader database instance 110.

Next, at S360, one or more shared database objects of the provider database instance are determined based on the reader mapping. Reader mapping 1130 may be used to scan the database catalog of provider database instance 100 for objects that are marked as sharable. More particularly, all file identifiers beginning with "1:" may be used to identify a corresponding record of the database catalog of provider database instance 100. The record is then examined to determine whether the object associated with the file identifier is to be shared with reader database instance 110.

FIG. 7 is a tabular representation of a portion of database catalog 1029 of provider database instance 100 according to some embodiments. The portion includes records for each of the provider-specific file identifiers shown in reader mapping 1130. As shown, database objects associated with two of the file identifiers have been flagged as shared.

The shared database objects are registered in a local namespace of reader database instance 110 at S370. This registration may comprise mapping file identifiers of each shared object to the objects' metadata in a local database catalog. FIG. 8 is a tabular representation of a portion of local database catalog 1131 according to some embodiments. Catalog 1131 is stored in data volumes 1124 and maps reader-specific and provider-specific file identifiers to object metadata. Catalog 1131 may include all or any subset of object metadata associated with the provider-specific file identifiers. In the illustrated embodiment, catalog 1131 does not store indices associated with the provider-specific file identifiers.

According to some embodiments, S360 and S370 occur only if the reader database instance receives a query that requires access to a particular object of the provider database instance. In these embodiments, S360 and S370 are executed with respect to the particular object.

The embodiments described herein are solely for the purpose of illustration. Those skilled in the art will recognize other embodiments may be practiced with modifications and alterations limited only by the claims.

What is claimed is:

1. A method comprising:
   reading a provider database mapping of file identifiers to page numbers of the provider database;
   generating, within a reader database, a reader database mapping of provider-specific file identifiers to provider-specific page numbers based on the provider database mapping;
   determining one or more shared database objects of the provider database based on the reader database, including using the reader database mapping to scan a database catalog of a provider database instance for objects that are marked as sharable; and registering the one or more shared database objects in a local namespace of the reader database.

2. A method according to claim 1, further comprising:
   reading a converter mapping of page numbers to block addresses of the provider database; and
   based on the converter mapping, generate a reader database converter mapping of provider-specific page numbers to provider-specific block addresses.

3. A method according to claim 1, wherein registering the one or more shared database objects in a local namespace of a reader database comprises:
   associating a file identifier of each of the one or more shared database objects with object metadata in a database catalog of the reader database.

4. A method according to claim 1, further comprising:
   reading a configuration file of the provider database.

5. A method according to claim 1, wherein the object metadata comprises first metadata that specifies an object name associated with the file identifier of one of the one or more shared database objects.

6. A method according to claim 5, wherein the object metadata comprises second metadata that specifies data types associated with the file identifier of the one of the one or more shared database objects.

7. A computer-readable storage medium storing program code, the program code comprising:
   code to read a provider database mapping of file identifiers to page numbers of the provider database;
   code to generate, within a reader database, a reader database mapping of provider-specific file identifiers to provider-specific page numbers based on the provider database mapping;
   code to determine one or more shared database objects of the provider database based on the reader database mapping, including code to use the reader mapping to scan a database catalog of a provider database instance for objects that are marked as sharable; and
   code to register the one or more shared database objects in a local namespace of the reader database.

8. A storage medium according to claim 7, the program code further comprising:
   code to read a converter mapping of page numbers to block addresses of the provider database; and
   code to generate, based on the converter mapping, a reader database converter mapping of provider-specific page numbers to provider-specific block addresses.

9. A storage medium according to claim 7, wherein the code to register the one or more shared database objects in a local namespace of a reader database comprises:
   code to associate a file identifier of each of the one or more shared database objects with object metadata in a database catalog of the reader database.

10. A storage medium according to claim 7, further comprising:
    code to read a configuration file of the provider database.

11. A system comprising:
    a provider database comprising:
        a data area comprising a plurality of data pages; and
        a provider file directory comprising a mapping of file identifiers to page numbers of the plurality of data pages; and a reader database including a computer to:
        read the mapping of file identifiers to page numbers from the provider file directory;
        generate a reader database mapping based on the mapping of file identifiers to page numbers from the provider file directory;
        determine one or more shared database objects of the provider database based on the reader database mapping, including using the reader mapping to scan a database catalog of a provider database instance for objects that are marked as sharable; and
        register the one or more shared database objects in a local namespace of the reader database.

12. A system according to claim 11, wherein the reader database comprises:
    a reader data area comprising a second plurality of data pages; and
    a reader file directory comprising a mapping of file identifiers to page numbers of the second plurality of data pages,
    wherein the hardware is further to:
    add a mapping of provider-specific file identifiers to provider-specific page numbers to the reader file directory based on the read mapping.

13. A system according to claim 11, wherein the provider database further comprises:
    a provider converter comprising a mapping of page numbers to block addresses of the provider data area,
    wherein the reader database comprises:
    a reader data area comprising a second plurality of data pages;
    a reader converter comprising a mapping of page numbers to block addresses of the reader data area, and
    wherein the hardware is further to:
    read the provider converter; and
    add a mapping of provider-specific page numbers to provider-specific block addresses to the reader converter based on the read provider converter.

14. A system according to claim 11, wherein the reader database comprises a reader metadata catalog, and
    wherein registering the one or more shared database objects comprises:
    associating a file identifier of each of the one or more shared database objects with object metadata of each of the one or more shared database objects in the reader metadata catalog.

15. A system according to claim 11, further comprising:
    reading a configuration file of the provider database to determine a location of the data area of the provider database.

* * * * *